3,182,038
PROCESS FOR CONTROLLING THE BULK
DENSITY OF POLYOXYMETHYLENE
Charles Richard Smoot, Vienna, W. Va.,
No Drawing. Filed Feb. 19, 1962, Ser. No. 174,293
6 Claims. (Cl. 260—67)

This invention relates to a method for producing polyoxymethylene, and, more particularly, to a method for controlling the physical characteristics of the polyoxymethylenes.

When formaldehyde or other suitable monomers are introduced into a hydrocarbon medium under substantially anhydrous conditions, the high molecular weight polymer formed therein, although satisfactory as to molecular weight and stability, etc., is produced in a form, i.e. a slurry, that is extremely difficult to manipulate in that the particles have an extremely low bulk density (approximately 0.08 gram/cubic centimeter) and an extremely high viscosity on the order of from 20 to 100 centipoises. In such a state, the slurry containing up to 5% solids is filtered only with extreme difficulty thereby militating against the use of standard, economical separation procedures. This phenomenon of high slurry viscosity is generally present only when high molecular weight polyoxymethylenes are being produced, i.e. those polymers having a molecular weight greater than about 25,000.

It is an object of the present invention to prevent the formation of highly viscous, gelatinous slurries during the polymerization of formaldehyde in inert solvents. Another object of the present invention is to provide a method for controlling the physical characteristics of a polyoxymethylene-solvent slurry, such as settling rate, filtration rate, viscosity and monomer absorbtivity. Still a further object of the present invention is to provide a means for controlling the physical characteristics of the polymer particles in an inert solvent, e.g. bulk density.

The above objects are accomplished by providing a process for preparing a high molecular weight polyoxymethylene having a bulk density in the range of 0.1 to 0.85 gram/ml. which comprises producing high molecular weight polyoxymethylene in a polymerization medium comprising an inert organic solvent and at least 5% by weight based upon the weight of the solvent of a preformed polyoxymethylene, maintaining the said concentration of polyoxymethylene, and thereafter recovering a polyoxymethylene having a bulk density of from 0.1 to 0.85 gram/ml. In the preferred embodiment of the present invention, the process is carried out by introducing a substantially pure formaldehyde (a formaldehyde of at least 99.5% purity) in a reaction medium comprising (1) A liquid hydrocarbon having 3 to 10 carbon atoms per molecule and being selected from the class consisting of aliphatic hydrocarbons, cycloaliphatic hydrocarbons, and aromatic hydrocarbons, cyclohexane being the preferred hydrocarbon in the above-mentioned class;
(2) A catalytic amount of a formaldehyde polymerization initiator; and
(3) At least 5% and, preferably, 10 to 40% by weight based upon the aforementioned hydrocarbon of a preformed polyoxymethylene.

After the polymerization has begun, a portion of the slurry is continuously filtered and the polyoxymethylene recovered at such a rate as to maintain the desired solids concentration. The polyoxymethylene which is recovered as described hereinabove will have a bulk density in the range of 0.2 to 0.85 gram/ml. Among the varieties of polyoxymethylene which are within the purview of the present invention are those polymers which contain re-occurring (—$CH_2$—O) units as the principal portion of the polymer chain. For example, there are the polyoxymethylene esters, the polyoxymethylene glycols in which the terminating groups are hydroxyl and polyoxymethylene ethers in which one of the terminating groups is an alkyl or aryl group joined to the polymer chain by an ether oxygen. Polymers containing minor amounts of another type of chain unit are also considered within the generic term "polyoxymethylene."

Any of the known types of initiators for the production of polyoxymethylene may be employed in the present invention. When formaldehyde is used as a monomer, any one of the group of known polymerization initiators, for example, aliphatic amines, tertiary amino nitrogen polymers, trihydrocarbon phosphines, arsines, or stibines, organo metallic compounds, metal carbonyls, quaternary ammonium, or phosphonium salts, and tertiary sulfonium salts. Such initiators and processes are described and claimed in United States Patents 2,734,889, issued on February 14, 1956, to F. C. Star, Jr.; U.S. 2,768,994, issued on October 13, 1956, to R. N. MacDonald; U.S. 2,828,286, issued on March 25, 1958, to R. N. MacDonald; U.S. 2,844,561, issued on July 22, 1958, to M. F. Bechtold et al.; U.S. 2,848,437, issued on August 19, 1958, to W. P. Langsdorf et al.; and U.S. 2,994,687, issued on August 1, 1961, to H. H. Goodman et al.

The following examples are intended to illustrate and not to restrict the present invention. Parts and percentages are by weight unless otherwise specified.

EXAMPLE I

A continuous polymerization apparatus was assembled which consisted of a 500 ml. glass flask, the upper portion thereof being equipped with an inlet for gaseous monomer, a vent connected to a suitable trap to maintain the apparatus at substantially atmospheric pressure, a thermometer, and a spray nozzle directed to discharge material towards the bottom of the flask. The bottom of the flask was equipped with a draw-off leading to a vertically mounted, 1 liter cylindrical vessel which provided additional holdup for completion of the polymerization reaction. The cylindrical vessel was equipped with an inlet at the upper portion and a discharge at the lower portion which returned the material to the aforementioned spray nozzle after passing through a heat-exchanger and a pump. The temperature of the system is controlled by controlling the water flow to the heat-exchanger and catalyst and solvent are added to the apparatus by a line arranged to discharge into the recirculating slurry. Means for drawing off the slurry is provided upstream of the inlet for make-up solvent and catalyst. The entire apparatus is thoroughly dried by passing dry nitrogen through all portions thereof followed by the introduction of a water-free slurry containing approximately 90% by weight of cyclohexane and 10% by weight of polyoxymethylene. The recirculation rate of the slurry was set at about 130 liters/hour after which gaseous, purified monomer produced by the pyrolysis of cyclohexyl hemiformal followed by partial condensation of the gases is introduced into the vessel, and additional solvent and catalyst [dimethyl(dihydrogenated tallow)ammonium acetate] flows are established. The gaseous formaldehyde may be produced according to the process set forth in United States Patent 2,848,500, issued on October 19, 1958, to D. L. Funck. The gaseous formaldehyde is introduced at such a rate to produce about 160 grams/hour of polymer. In this example, about 400 ml. of cyclohexane were charged to the reactor along with a suitable amount of polymerization catalyst and circulation was established by energizing the pump, whereupon monomer was introduced through the aforementioned line. After approximately 15 minutes, the temperature of the reactor had risen to 34.8° C. from an initial temperature of 26° C. and cyclohexane and catalyst make-up solution were directed to the recirculation line at the rate of about 40 ml./minute. In this run, no attempt was made to control the temperature and the solids content of the slurry was permitted to increase until acceptable slurries could be withdrawn. After approximately 40 minutes, a small amount of slurry was withdrawn which contained 2.9% by weight of solids. The polymer herein was quite feathery and had an extremely low bulk density (0.023). It was adjudged that this slurry was unacceptable from the standpoints of filterability and viscosity. Polymerization was continued, and at approximately 45 minutes after the aforementioned sample was removed, an additional sample of slurry was recovered which contained 4.0% by weight of solids which solids exhibited a bulk density of 0.048. The second sample of slurry contained feathery polymer, and was highly viscous and was adjudged unsatisfactory for subsequent processing. After continuing polymerization for an additional 35 minutes, a third sample of slurry was removed from the reactor containing 5.4% by weight solids, which solids exhibited a bulk density of 0.13. The third sample of slurry had lost practically all of its former viscosity, and was easily filterable and adjudged to be very satisfactory for further processing. The slurry was again sampled after an additional 30 minutes of operation, and was found to contain 6.1% solids whose bulk density was 0.134. This slurry could also be easily filtered and was adjudged very satisfactory for further processing. In view of these results, it became apparent that slurry which would be acceptable from a processability standpoint and solids which would be acceptable from a density standpoint could only be produced when the weight percent solids in the slurry exceeded 5%.

EXAMPLE II

The apparatus described in Example I was employed herein to investigate the handling characteristics of a slurry produced at various levels of solids in the slurry. The reactor was charged with 450 ml. of cyclohexane and 50 grams of dry polyoxymethylene. The make-up stream consisted of 30 ml./minute of a cyclohexane solution containing the same type of catalyst as used in Example I at a rate sufficient to maintain a minimum catalyst level within the reactor. The only slurry which was within the reactor. The only slurry which was withdrawn from the reactor was that used to determine the weight percent solids based upon the cyclohexane and the bulk density of the solid polymer. The results of this investigation are set forth in Table I from which it may be noted that the initial slurry possessed suitable characteristics from a processability standpoint when 10% by weight of solids were present in the slurry before the introduction of the monomer and subsequent polymerization. The data obtained indicated that slurry of acceptable processability and solids of acceptable bulk density may be produced over a wide range of solids concentration in the slurry above the minimum concentration of 5% by weight based upon the solvent. Generally, it is preferable to employ 10–40% solids, and more preferably 20–30% solids with cyclohexane as the inert solvent. The temperature of the reaction medium was controlled for the most part at about 48.5° C. by controlling the water to the heat-exchanger as described in Example I. The variations in bulk density can be accounted for in part by the variance in molecular weight of the polymers throughout the run, however, satisfactory solids characteristics and slurry handling were obtained throughout the range of values reported. Comparable results were obtained employing toluene in place of cyclohexane as the solvent. In addition to obtaining a polymer-solvent slurry which is non-gelatinous, rapid settling, of low viscosity, and of acceptable filterability, the monomer absorption rate is markedly increased when greater than 5% by weight of solids are maintained in the reaction medium. For example, the slurry produced in the initial phase of Example I, resulted in reduced monomer absorption rates, increased plugging of the equipment, and a very "wet" filter cake. The polymer from these gelatinous slurries was low in bulk density, possessed excessive fines, and did not handle well in standard solids handling equipment.

Although the foregoing examples illustrate the use of formaldehyde as the monomer for the preparation of the polyoxymethylene, other monomers such as trioxane are operable in the process. When the monomer is normally liquid at a temperature and pressure which is commercially practical for polymerization, it is often advantageous to use the monomer as the solvent to eliminate the processing difficulties associated with the introduction of an additional component in the process. The liquid monomer would then function as the inert solvent. One skilled in the art will readily appreciate that a slurry of solids in a gas such as nitrogen would also be contemplated by the present invention. In this embodiment, the gas would function as the inert solvent.

A process of the present invention will find widespread use in systems which produce polyoxymethylene in that the slurries obtained in these systems will be easily processed and will permit rapid absorption of monomer and thus increase production rate for a given size of reactor.

Table I

| Approximate Time of Sample Removal (minutes) | Temperature of Reaction Medium (° C.) | Weight Percent Solids in Slurry | Bulk Density of Solids (gms./cc.) |
| --- | --- | --- | --- |
| 0 | 28.5 | 10 | (¹) |
| 100 | 49.5 | 11.3 | (¹) |
| 140 | 48.5 | 11.2 | 0.15 |
| 180 | 48.5 | 10.9 | 0.14 |
| 200 | 48.5 | 12.1 | 0.15 |
| 230 | 43.0 | 14.1 | 0.43 |
| 260 | 48.3 | 18.9 | 0.40 |

¹ Not measured.

I claim:
1. A process for preparing a high molecular weight polyoxymethylene having a bulk density in the range of 0.1 to 0.85 gram per milliliter which comprises producing high molecular weight polyoxymethylene in an inert solvent containing a polymerization catalyst and at least 5% by weight based upon the weight of said solvent of a solid preformed polyoxymethylene and thereafter recovering a high molecular weight polyoxymethylene having a bulk density in the range of 0.1 to 0.85 gram per milliliter.

2. A process for preparing a high molecular weight polyoxymethylene having a bulk density in the range of 0.1 to 0.85 gram per milliliter which comprises producing high molecular weight polyoxymethylene in an inert organic solvent containing a formaldehyde polymerization catalyst and at least 5% by weight based upon said solvent of a preformed solid polyoxymethylene and thereafter recovering a high molecular weight polyoxymethylene having a bulk density in the range of 0.1 to 0.85 gram per milliliter.

3. A process for the preparation of a free-flowing powder of high molecular weight polyoxymethylene which comprises introducing a substantially pure formaldehyde into a reaction comprising
 (a) a liquid hydrocarbon having 3 to 10 carbon atoms per molecule and being selected from the class consisting of aliphatic hydrocarbons, cyclo aliphatic hydrocarbons, and aromatic hydrocarbons;
 (b) a catalytic amount of a formaldehyde polymerization initiator; and
 (c) at least 5% by weight based upon said hydrocarbon of a preformed solid polyoxymethylene and thereafter recovering a high molecular weight polyoxymethylene having a bulk density of from 0.1 to 0.85 gram per milliliter.

4. The process of claim 3 wherein said preformed polyoxymethylene is present at a concentration of 10 to 40% by weight based upon said hydrocarbon.

5. The process of claim 4 wherein said hydrocarbon is cyclohexane.

6. The process of claim 5 wherein said preformed polyoxymethylene is present in a concentration of 20 to 30% by weight based upon said hydrocarbon.

References Cited by the Examiner
UNITED STATES PATENTS

| | | | |
|---|---|---|---|
| 2,593,862 | 4/52 | Eickmeyer | 260—67 |
| 2,951,059 | 8/60 | Axtell et al. | 260—67 |
| 2,989,510 | 6/61 | Bruni | 260—67 |
| 3,030,338 | 3/62 | Aries | 260—67 |
| 3,071,564 | 1/63 | De Fazio et al. | 260—67 |
| 3,087,911 | 4/63 | Ainsworth | 260—67 |

WILLIAM H. SHORT, *Primary Examiner.*

J. R. LIBERMAN, *Examiner.*